Dec. 27, 1932.   H. T. SEELEY   1,891,952

AUTOMATIC CONTROL EQUIPMENT

Filed Dec. 21, 1929

Inventor:
Harold T. Seeley,
by Charles V. Tullar
His Attorney.

Patented Dec. 27, 1932

1,891,952

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed December 21, 1929. Serial No. 415,719.

My invention relates to automatic control equipments for electric translating devices and particularly to automatic control equipments for starting synchronous dynamo electric machines and its object is to provide an improved arrangement of apparatus for use in such automatic control equipments.

My invention will be better understood from the following description when taken in connection with the accompanying drawing and its scope will be pointed out in the appended claims.

Figure 1:
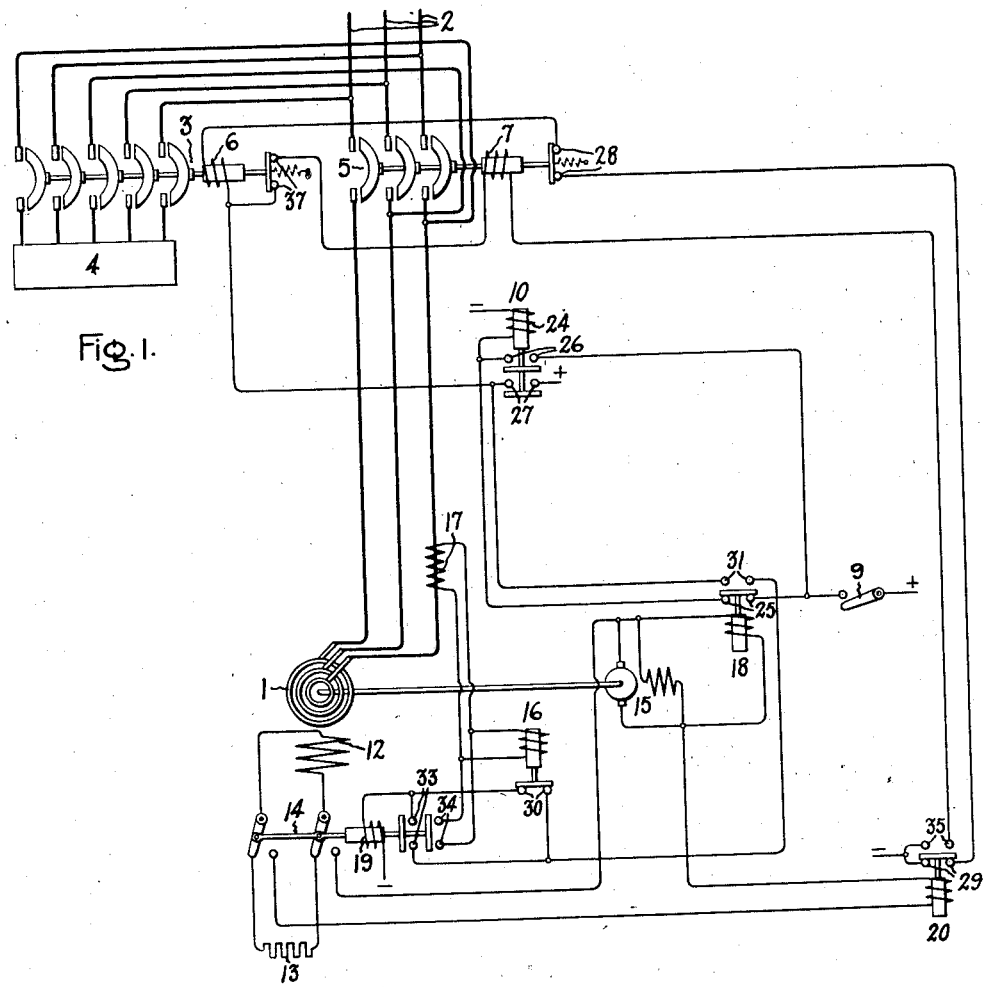
Figure 2:
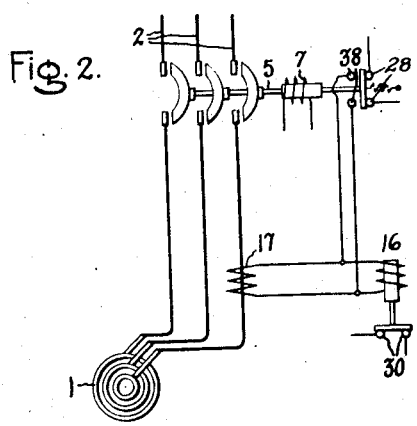

In the accompanying drawing Fig. 1 shows diagrammatically an automatic control equipment for a synchronous motor, embodying my invention, and Fig. 2 shows a modification of a portion of the control equipment shown in Fig. 1.

Referring to Fig. 1 of the accompanying drawing, 1 represents a synchronous motor the armature winding of which is arranged to be supplied from a suitable source of alternating current 2 shown as a polyphase supply circuit. In order that a relatively low voltage may be impressed upon the armature winding to start the motor, a starting switch 3 is provided which, when closed, connects a compensator 4 between the motor 1 and the supply circuit 2. In order that normal voltage may be impressed upon the armature winding after the motor 1 has been started, a running switch 5 is provided which, when closed, connects the armature winding of the motor directly across the supply circuit 2. The switches 3 and 5 may be of any suitable type, examples of which are well known in the art. As shown in the drawing, the switches 3 and 5 are contactors and are respectively provided with the closing coils 6 and 7 which, when energized, close the respective contactors.

In order to start and stop the motor 1, under normal conditions, a hand switch 9 is provided which, when closed, effects the starting of the motor and which, when opened, effects the stopping of the motor. It is to be understood, however, that any other suitable control means, examples of which are well known in the art, may be used in place of the hand switch 9 to effect the starting and stopping of the motor 1. As shown in the drawing, the switch 9, when closed, completes an energizing circuit for a master relay 10 which, in turn, completes a circuit for the closing coil 6 of the starting contactor 3.

In order that the synchronous motor 1 may operate as an induction motor while it is accelerating from rest to approximately synchronous speed, the field winding 12 of the synchronous motor 1 is arranged to be short-circuited through a discharge resistor 13 while the motor is accelerating. When the motor speed reaches a predetermined value, a field switch 14 is operated to disconnect the motor field winding 12 from the discharge resistor 13 and to connect the motor field winding 12 to a suitable source of excitation, such, for example, as a shunt exciter 15 driven by the synchronous motor 1. For controlling the operation of the field switch 14, I provide a current relay 16 which is connected so as to be energized in response to the amount of current supplied to the synchronous motor from the supply circuit 2. As shown in the drawing, the coil of the current relay 16 is connected in the secondary circuit of a current transformer 17, the primary winding of which is arranged to be connected in series between the armature winding of the motor 1 and the supply circuit 2. The current relay 16, and a voltage relay 18, which is responsive to the exciter voltage, control the energizing circuit of the closing coil 19 of the field switch 14 so that the closing coil 19 is energized when the motor speed is such that the starting current of the motor is below a predetermined value and the exciter voltage is above a predetermined value.

After the field switch 14 is closed so that the motor field winding 12 is energized with direct curent to pull the motor into synchronism, the starting switch 3 is opened and the running switch 5 is closed. This result is accomplished in the arrangement disclosed in the drawing by means of a current relay 20 which is responsive to the direct current supplied to the motor field winding 12 by the exciter 15. When the motor field current builds up to a predetermined value, the field relay 20 operates to effect the deenergization of the closing coil 6 of the starting switch 3 and the energization of the closing coil 7 of the running switch 5.

In order that a relay, which does not have to be designed to withstand normal full load current of the synchronous motor for an indefinite time, may be used as a current responsive relay 16, I provide, in accordance with my invention, an arrangement for changing the effectiveness of the relay 16 after it has effected the operation of the switching means controlled thereby during the starting operation of the synchronous motor. In the particular embodiment of my invention shown in Fig. 1, I arrange the field switch 14 so that when it connects the motor field winding 12 across the exciter 15, it also completes a shunt circuit around the coil of the relay 16 in order that the ratio of the current through the coil of relay 16 to the current supplied to the motor is varied in such a manner that a given motor current causes a much smaller current to flow through the relay coil. Preferably, the shunt circuit around the relay coil is a relatively low resistance circuit so that substantially no current flows through the coil of relay 16 when this shunt circuit is completed.

The operation of the arrangement shown in Fig. 1 is as follows: When the motor 1 is shut down and the control switch 9 is open, the various control devices are in the positions shown in the drawing. When it is desired to start the motor 1, the control switch 9 is closed and a circuit is completed for the closing coil 24 of the master control relay 10. This energizing circuit is from one side of a suitable control circuit through the control switch 9, contacts 25 of the voltage relay 18, coil 24 of the master control relay 10 to the other side of the control circuit. The master control relay 10 by closing its contacts 26 completes a locking circuit for itself which is independent of the contacts 25 of the voltage relay 18. Therefore, the master control relay 10 is not deenergized in response to the subsequent energization of the voltage relay 18 during the starting operation of the motor. In case the master control relay 10 becomes deenergized, however, it cannot be reenergized until after the speed of the motor 1 has decreased to a sufficient value to allow the voltage of the exciter 15 to decrease below the drop-out value of the voltage relay 18.

The master control relay 10 by closing its contacts 27 completes an energizing circuit for the closing coil 6 of the starting switch 3 so that the compensator 4 is interconnected between the armature winding of the motor 1 and the supply circuit 2. The energizing circuit of the closing coil 6 is from one side of the control circuit through the contacts 27 of the master control relay 10, closing coil 6 of the starting switch 3, auxiliary contacts 28 on the running switch 5, contacts 29 of the field relay 20 to the other side of the control circuit.

The closing of the starting switch 3 causes the synchronous motor 1 to operate as an induction motor since its motor field winding 12 is short-circuited through the discharge resistor 13.

As soon as the starting switch 3 closes, the inrush current to the armature winding of the motor 1 causes the current relay 16 to pick up and open its contacts 30. The relay 16 remains picked up until the motor reaches substantially synchronous speed when the current supplied to the motor decreases to a value sufficient to allow the relay 16 to close its contacts 30. As the motor approaches synchronous speed, the exciter voltage builds up and when it reaches a predetermined value, the voltage relay 18 opens its contacts 25 and closes its contacts 31. As soon as the motor has reached synchronous speed so that the contacts 30 of the current relay 16 and the contacts 31 of the voltage relay 18 are closed, an energizing circuit is completed for the closing coil 19 of the field switch 14 so that the motor field winding 12 is connected across the terminals of the exciter 15. This energizing circuit for the closing coil 19 is from one side of the control circuit through the contacts 27 of the master control relay 10, contacts 31 of the voltage relay 18, contacts 30 of the current relay 16, closing coil 19 of the field switch 14 to the other side of the control circuit. The field switch 14 by closing its auxiliary contacts 33 completes a locking circuit for itself which is independent of the contacts 30 of the current relay 16, and by closing its auxiliary contacts 34 completes a low resistance shunt circuit around the coil of the relay 16.

As soon as the direct current through the motor field winding 12 exceeds a predetermined value, the relay 20 opens its contacts 29 and closes its contacts 35. The opening of the contacts 29 deenergizes the closing coil 6 of the starting switching 3 so that the compensator 4 is disconnected from the motor 1 and the supply circuit 2. As soon as the starting switch 3 opens, an energizing circuit is completed for the closing coil 7 of the running switch 5 so that the motor 1 is connected directly to the supply circuit 2. This energizing circuit for the closing coil 7 is from one side of the control circuit through the contacts 27 of the master control relay 10, auxiliary contacts 37 on the starting switch 3, closing coil 7 of the running switch 5, contacts 35 of the field relay 20 to the other side of the control circuit.

The motor is shut down under normal conditions by opening the control switch 9 which, in turn, opens the holding circuit of the closing coil 24 of the master control relay 10. The master control relay 10 by opening its contacts 27 opens the circuit of the closing coil 7 of the running switch 5 so that the motor armature winding is disconnected from the supply circuit 2. The opening of the contacts 27 of the relay 10 also effects the deenergization of the closing coil 19 of the field switch 14 so that the field winding 12 is disconnected from the exciter 15 and is reconnected to the discharge resistor 13.

In the modification of my invention shown in Fig. 2 the shunt circuit around the coil of the relay 16 is completed by auxiliary contacts 38 on the running switch 5 instead of auxiliary contacts on the field switch 14. Therefore, when the arrangement shown in Fig. 2 is used the shunt circuit around the coil of the relay 16 is not completed until after the starting operation of the motor has been completed and the running switch 5 has been closed.

While I have, in accordance with the Patent Statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current supply circuit, a translating device, means for connecting said device to said circuit, means responsive to the current supplied by said supply circuit to said device, switching means for controlling the operation of said device, means controlled by said current responsive means for effecting the operation of said switching means when the current supplied to said device decreases below a predetermined value, and means controlled by said switching means for changing the effectiveness of said current responsive means.

2. In combination, an alternating current supply circuit, a dynamo electric machine, means for connecting said machine to said circuit, electroresponsive means connected to said supply circuit so that it is energized in accordance with the amount of current supplied to said machine, switching means for controlling the operation of said machine, means controlled by said electroresponsive means for effecting the operation of said switching means when the current supplied to said machine decreases below a predetermined value and means controlled by said switching means for varying the ratio between the current through the winding of said electroresponsive means and the current supplied to said machine from said supply circuit.

3. In combination, an alternating current supply circuit, a dynamo electric machine, a current transformer, means for connecting the primary winding of said current transformer and said machine in series across said supply circuit, a relay connected in the secondary circuit of said current transformer, switching means for controlling the operation of said machine, means controlled by said relay for effecting the operation of said switching means when the current supplied to said machine decreases below a predetermined value after said machine has been connected to said supply circuit, and means controlled by said switching means for completing a shunt circuit around the winding of said relay.

4. In combination, an alternating current supply circuit, a synchronous dynamo electric machine, a current transformer, means for connecting the primary winding of said current transformer and the armature winding of said machine in series across said supply circuit, a relay connected in the secondary circuit of said current transformer, a source of excitation, a switch for connecting said source to the field winding of said machine, means controlled by said relay for effecting the closing of said switch when the current supplied to armature winding of said machine decreases below a predetermined value after said armature winding is connected to said supply circuit, and means controlled by said switch for completing a shunt circuit around the winding of said relay.

In witness whereof, I have hereto set my hand this 14th day of December, 1929.

HAROLD T. SEELEY.